US006085515A

United States Patent [19]

Walz et al.

[11] Patent Number: 6,085,515

[45] Date of Patent: Jul. 11, 2000

[54] HEAT SHIELD CONFIGURATION, PARTICULARLY FOR STRUCTURAL PARTS OF GAS TURBINE PLANTS

[75] Inventors: Guenther Walz; Jens Kleinfeld, both of Muelheim A.D. Ruhr; Robert Frantzheld, Berlin; Helmut Neugebauer, Bochum, all of Germany

[73] Assignee: Siemens Aktiengesellschaft, Munich, Germany

[21] Appl. No.: 09/208,359

[22] Filed: Dec. 10, 1998

Related U.S. Application Data

[63] Continuation of application No. PCT/DE97/01169, Jun. 10, 1997.

[30] Foreign Application Priority Data

Jun. 11, 1996 [DE] Germany ........................ 196 23 300.3

[51] Int. Cl.[7] ................................ F02C 1/00; F02G 3/00

[52] U.S. Cl. ............................ 60/39.32; 60/752; 60/753; 60/757; 110/336; 431/352

[58] Field of Search ............................ 60/752, 753, 755, 60/756, 757, 758, 759, 760, 266, 39.32, 267; 239/127.3; 110/336, 338; 432/119, 116; 431/351, 352

[56] References Cited

U.S. PATENT DOCUMENTS

| | | | |
|---|---|---|---|
| 3,661,477 | 5/1972 | Westrum | 417/373 |
| 4,073,318 | 2/1978 | Close et al. | 138/149 |
| 4,157,001 | 6/1979 | Pickles | 52/506.02 |
| 4,379,382 | 4/1983 | Sauder | 52/506.02 |
| 4,432,289 | 2/1984 | Norman et al. | 110/336 |
| 4,840,131 | 6/1989 | Meumann et al. | 110/336 |
| 5,063,861 | 11/1991 | Imogawa et al. | 110/336 |
| 5,079,912 | 1/1992 | Cires et al. | 60/266 |
| 5,083,424 | 1/1992 | Becker | 60/754 |
| 5,129,447 | 7/1992 | Hamner | 60/752 |
| 5,226,598 | 7/1993 | Woehrl | 239/127.1 |
| 5,592,814 | 1/1997 | Palusis et al. | 60/271 |
| 5,624,256 | 4/1997 | Pfeiffer et al. | 432/252 |

*Primary Examiner*—Ted Kim
*Attorney, Agent, or Firm*—Herbert L. Lerner; Laurence A. Greenberg; Werner H. Stemer

[57] ABSTRACT

A heat shield configuration, particularly for protecting supporting structures and structural parts of gas turbine plants against a hot fluid. The heat shield has an inner lining which consists of a heat-resistant material and which is composed of plate-shaped heat-shield elements resistant to high temperatures and are disposed next to one another with gaps in-between. The heat-shield elements cover the entire area of the structural part. The heat shield is anchored so as to be thermally movable to the supporting structures and parts by bolts. The heat-shield element is formed of an erosion-proof and corrosion-proof material. An insulating brick formed of a refractory ceramic is disposed in each case between each heat-shield element and the supporting structure or parts.

23 Claims, 3 Drawing Sheets

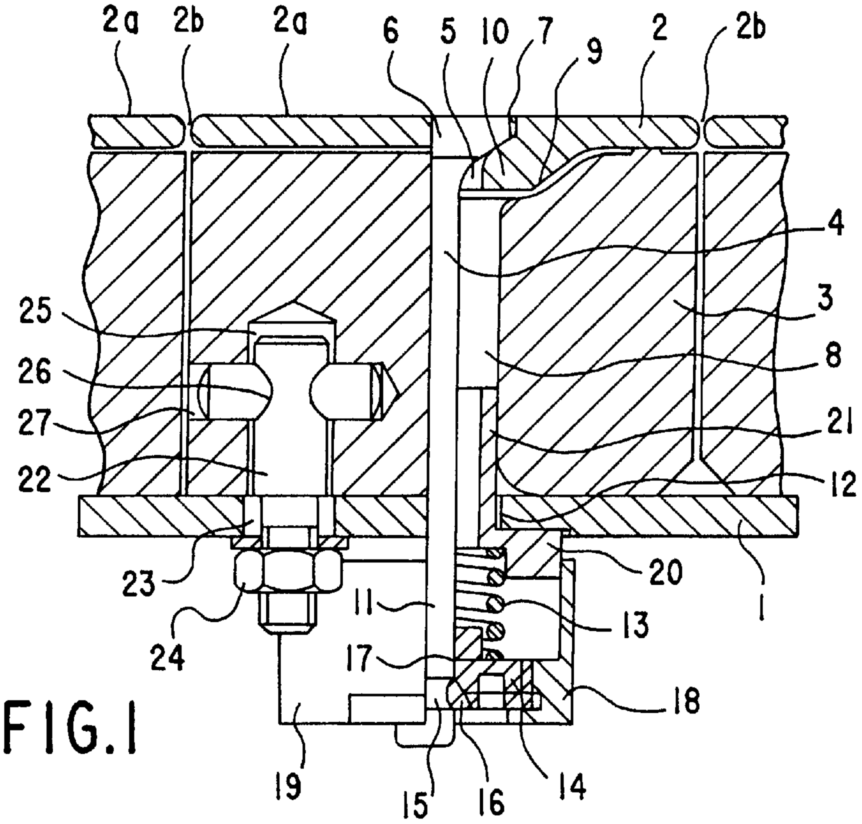
FIG.1
FIG.2
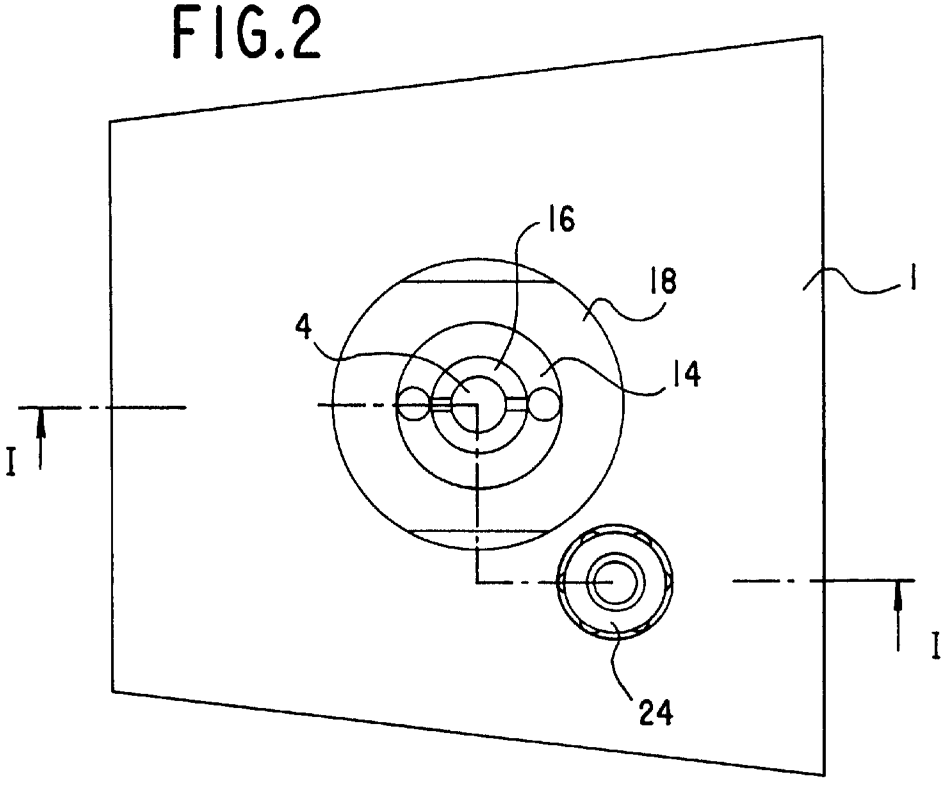

HEAT SHIELD CONFIGURATION, PARTICULARLY FOR STRUCTURAL PARTS OF GAS TURBINE PLANTS

CROSS REFERENCE TO A RELATED APPLICATION

This application is a continuation of International Application PCT/DE97/01169, filed Jun. 10, 1997, which designated the United States.

BACKGROUND OF THE INVENTION

1. Field of the Invention

The present invention relates to a heat shield configuration for protecting a supporting structure against a hot fluid. The heat shield configuration has an inner liner formed of a heat resistant material and is composed of plate-shaped heat shield elements resistant to high temperatures. The heat shield elements are disposed next to one another with gaps in-between. The heat shield elements cover the entire area of the supporting structure.

Such a heat shield configuration is known, for example, from European Patent Application EP 0 224 817 A. This publication proposes that the heat shield configuration have an inner lining consisting of a heat-resistant material. The inner lining is composed of plate-shaped heat-shield elements resistant to high temperatures that are disposed next to one another so as to cover the entire area, with gaps being left. The individual heat-shield elements are anchored to the supporting structure by bolts so as to be thermally movable.

The individual heat-shield elements are configured in the manner of a mushroom with a cap part and a stem part, the cap part being a plane or three-dimensional polygonal plate body.

Such heat shield configurations for protecting a supporting structure against a hot fluid, with an inner lining consisting of heat-resistant material, are used, in particular, for constructing a combustion chamber, particularly for gas turbines. An atmosphere attacking the inner lining is generated in the combustion chamber of a gas turbine during the combustion operation. While a gas turbine is operating, the inner lining is exposed to a relatively high temperature. In addition to the thermal load on the inner lining, structural changes to the heat-shield elements may occur on account of the temperature and gas atmosphere. The individual heat-shield elements of a heat shield configuration also undergo dynamic loading due to vibrations that arise in a combustion chamber of a gas turbine during the combustion operation. In order to reduce the thermal load on the inner lining and consequently on the individual heat-shield elements, it is known to cool the heat-shield elements in relation to the combustion-chamber wall. The coolant flows around the underside of the heat-shield elements and flows through the gaps between the individual heat-shield elements into the combustion chamber, the gaps ensuring that the heat-shield elements are cooled with regard to the hot gas. The introduction of cooling air into the combustion chamber leads to an increased nitrogen oxide emission, since the combustion takes place with an excess of air. However, the emission of nitrogen oxides is undesirable. If the gas turbine is to be operated at increased temperatures, this entails an increased coolant consumption.

Published, Non-Prosecuted German Patent Application DE 41 14 768 Al describes a heat shield on a structure, in particular a flame tube for a gas turbine. The structure carries hot gases and has a supporting wall, and the heat shield consists of a multiplicity of bricks. The bricks are disposed next to one another so as to cover essentially the entire area and are each fastened to the supporting wall by at least one associated holder. Each brick has a cold side facing the supporting wall, a hot side facing away from the supporting wall and at least two flanks which connect the cold side to the hot side. Each associated holder is fastened to the supporting wall and contains at least two interacting clamp lugs which engage the respectively associated brick on the cold side between the flanks. Each holder consists preferably of sheet metal and each brick of a ceramic.

U.S. Pat. No. 5,333,433 teaches a sealing configuration for sealing an opening between the combustion chamber stone and a supporting structure of a combustion chamber. The combustion chamber stone includes a fireproof interior lining of a part of a circular combustion chamber. The combustion chamber stone is placed with a perpendicularly bent rim in an opening of the supporting structure and fixed with a bolt. Between the combustion chamber stone and the supporting structure remains an opening. Through the opening cooling air which is fed through bores in the supporting structure towards the interior side of the combustion chamber stones can escape. To prevent a cooling air loss a sealing configuration is provided. The combustion chamber stone is made completely and homogeneously of a fireproof ceramic.

SUMMARY OF THE INVENTION

It is accordingly an object of the invention to provide a heat shield configuration, particular for structural parts of gas turbine plants, which overcomes the above-mentioned disadvantages of the prior art devices of this general type, which is effective at increased temperatures. Furthermore, the coolant requirement and coolant consumption are to be reduced by the heat shield configuration. A further aim of the invention is to reduce the nitrogen oxide emission of a gas turbine.

With the foregoing and other objects in view there is provided, in accordance with the invention, in combination with a supporting structure, a heat shield configuration for protecting the supporting structure against a hot fluid, the heat shield configuration includes: an inner lining formed of a heat-resistant material and having substantially plate-shaped heat-shield elements disposed next to one another with gaps in-between and covering an entire area of the supporting structure, the heat-shield elements are formed of an erosion-proof and corrosion-proof material and are resistant to high temperatures; at least one fastening element anchors the heat-shield elements thermally movable to the supporting structure; and a thermal insulation is disposed between the heat-shield elements and the supporting structure.

The heat shield configuration according to the invention protects the supporting structure against a hot fluid, with an inner lining consisting of heat-resistant material. The heat shield configuration is distinguished in that the heat-shield elements consist of an erosion-proof and corrosion-proof material that is preferably resistant to high temperatures. A thermal insulation is formed between each heat-shield element and the supporting structure. The embodiment of the heat shield configuration gives rise to a layered construction of the inner lining. The layered construction of the inner lining achieves a separation of individual functions of the inner lining. According to the proposals known hitherto for constructing an inner lining, such as is described, for example, in European Patent Application EP 0 224 817 A, German Patent Specification 1 173 734 or Published, Non- Prosecuted German Patent Application 1 052 750, the individual heat-shield elements had to satisfy within themselves all the requirements placed on them. This restricts the choice of material of the heat-shield elements. In contrast to this, due to the layered construction of the inner lining and a suitable choice of material, the inner lining can be better adapted to the intended use or purpose for which it is employed. The heat-shield elements have a function of protecting against the erosive and corrosive influences of the gas atmosphere. The heat-shield element as such does not necessarily have to exercise a thermally insulating effect. The thermal insulation formed between each heat-shield element and the supporting structure is formed preferably by a mat consisting of a fibrous material or by a refractory ceramic. The refractory ceramic is, for example, an insulating brick. Since the thermal insulation is protected against erosion and corrosion by a heat-shield element, the thermal insulation may consist of a material that could be attacked by the gas atmosphere in, for example, a combustion chamber. If required, the inner lining may be cooled by a coolant. The coolant consumption is reduced due to the layered construction of the inner lining. If the coolant is cooling air, the quantity of air introduced into the combustion chamber is also reduced. The combustion operation in the combustion chamber may thereby be carried out near the ideal air ratio, with the result that the emission of nitrogen oxides is reduced. A higher turbine inlet temperature is also reached by virtue of the heat shield configuration. An equalization of temperature may also be achieved by filtering the air.

The heat-shield element preferably consists of a structural ceramic. The structural ceramic is preferably silicon carbide or silicon nitride. A structural ceramic consisting of such a material has the positive properties that it is insensitive to the corrosive and erosive influences of the gas atmosphere. Furthermore, the structural ceramic is distinguished by high temperature resistance. Silicon carbide and silicon nitride are the preferred materials which may be used for constructing the heat-shield elements. However, the heat-shield elements may also consist of other ceramic materials, insofar as they are, with regard to their properties, similar to the preferred materials. The heat-shield elements are preferably of essentially plate-shaped construction. An embodiment of the heat-shield elements, in which at least the edge region facing the hot fluid is preferably configured to be curved.

According to a further advantageous embodiment, the heat-shield element and the insulating brick are essentially congruent.

Instead of a structural ceramic the heat-shield element may also be a ceramic-coated metal plate.

The heat-shield elements are anchored to the supporting structure by a fastening element, particularly a bolt. The bolt is preferably a bolt that consists of a ceramic material, preferably of the same material as the heat-shield element, particularly of silicon carbide or silicon nitride. The bolt has a head preferably at a free end. The heat-shield element has a passage orifice, through which the bolt extends, the head of the bolt resting on the heat-shield element. On the one hand, the heat-shield element is retained by the head of the bolt and, an the other hand, the head of the bolt seals off the passage orifice of the heat-shield element. The heat-shield element preferably has a seat for the head of the bolt, so that the head is countersunk in the heat-shield element. A plane surface of the heat-shield element is thereby achieved. To simplify assembly, the insulating brick preferably has a duct, through which the bolt extends. In order to compensate different thermal expansions of the bolt, the heat-shield element and the insulating brick, the bolt is preferably disposed with play in the duct of the insulating brick.

The heat-shield element is anchored to the supporting structure by the fastening element of the bolt preferably so as to be thermally movable. To compensate the different thermal expansions occurring as a result of different coefficients of thermal expansion in the materials, the bolt is displaceable in the axial direction of the bolt preferably counter to a spring force. Anchoring takes place preferably on that wall of the supporting structure that faces away from the inner lining. For this purpose, the supporting structure has at least one wall, through which at least one end portion of the bolt extends. A spring element, preferably a compression spring, engages on the end portion of the bolt. According to a further advantageous embodiment, it is proposed that the compression spring surround the end portion of the bolt. Preferably, a holding element, which forms a first abutment for the compression spring, is disposed on the end portion of the bolt. A spacer piece, which forms a second abutment for the compression spring, is preferably disposed on the wall of the supporting structure.

The holding element is connected releasably to the end portion of the bolt, preferably in a wedge-shaped manner. For this purpose, the end portion has a peripheral groove, into which engages a wedge, preferably a peripheral wedge-shaped projection formed on the holding element. In order to ensure that the compression spring does not lose its spring properties as a result of deposits of dirt or corrosion, a cap is preferably connected to the holding element in such a way that the cap, holding element and spacer piece form a chamber, and the cap surrounds the spacer piece. Alternatively, the cap may be connected to the spacer piece, in which case the cap surrounds the holding element. In the last-mentioned embodiment, displacement of the holding element within the cap takes place in the manner of a piston/cylinder configuration. For the purpose of checking the compression spring, the cap is releasably connected, preferably screwed, to the holding element or to the spacer piece.

According to one of the embodiments of the heat shield configuration, the heat shield configuration is assembled by disposing the heat-shield element on the insulating brick. The bolt is subsequently guided through the heat-shield element and the insulating brick. An end portion of the bolt projects from the insulating brick. This end portion must subsequently be guided through a bore formed in the combustion chamber wall. To simplify assembly, it is proposed that the spacer piece have a guide tube projecting into the duct of the insulating brick. This embodiment makes it possible to preassemble the insulating brick on the guide tube of the spacer piece. In the construction of the heat shield configuration, therefore, all the insulating bricks can first be mounted on the combustion-chamber wall through the guide tubes. The heat-shield elements are subsequently mounted on the insulating bricks by the bolts.

In order to be sure that, if the bolt or heat-shield element fails, the insulating brick remains connected to the structure, the insulating bricks are preferably connected to the structure by a retaining bolt.

The outer contour of the heat-shield element may have a varying geometry. In order to ensure that possible displacement or twisting of the insulating brick does not cause it to come into contact with adjacent insulating bricks, the insulating brick is preferably connected positively to the heat-shield element. For this purpose, the insulating brick preferably has, in one surface, a recess, into which engages a projection formed correspondingly on the heat-shield element. This prevents the insulating brick from being displaced or twisted relative to the heat-shield element.

According to a further advantageous embodiment of the heat shield configuration, the latter is cooled by a coolant. The cooling of the heat shield configuration is known per se. In contrast to the known solutions, a coolant is led through between the heat-shield element and the insulating brick, for which purpose at least one coolant duct is provided between the heat-shield element and the insulating brick. The coolant duct has an inlet, which is connected to a coolant supply duct, and an outlet, which is open to the ambient atmosphere. The coolant duct is preferably formed by disposing the heat-shield element at a distance from the thermal insulation so as to form a gap-like coolant duct. The distance between the heat-shield element and the thermal insulation is between 0.3 and 1.5 mm, preferably 1 mm. To maintain such a distance between the heat-shield element and the thermal insulation, preferably at least one distance piece is placed between these components. A configuration, in which the distance is between 0.3 and 1.5 mm, preferably 1 mm, is preferred. Three distance pieces, which are disposed on an imaginary circle circumference, are preferably provided, the center of the imaginary circle circumference being located essentially at the center of the heat-shield element. In such a construction, the bolt which engages on the heat-shield element is disposed at the center of the heat-shield element.

The distance pieces are disposed on the heat-shield element and/or on the insulating brick. A construction, in which the distance pieces form an integral part of the heat-shield element or of the insulating brick is preferred. The distance pieces can be configured in the form of bosses. They may have, for example, a construction resembling a truncated pyramid. The bearing surface of the distance pieces on which the heat-shield element or the insulating brick rests is preferably between 9 and 64 $mm^2$, particularly 25 $mm^2$.

The coolant duct may be disposed partially in the insulating brick and/or in the heat-shield element. A coolant is supplied via the duct configured in the insulating brick. It is proposed that the cap have at least one coolant supply bore. By configuring the coolant supply bores in the cap, cooling can be regulated. The coolant supply bores each form a throttle for a cooling fluid. In order to keep the losses of coolant as low as possible, it is proposed that the chamber be closed off in an essentially air-tight manner relative to the surroundings.

Other features which are considered as characteristic for the invention are set forth in the appended claims.

Although the invention is illustrated and described herein as embodied in a heat shield configuration, particular for structural parts of gas turbine plants, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, sectional view through a heat shield configuration of a first exemplary embodiment according to the invention;

FIG. 2 is a bottom plan view of the configuration according to FIG. 1;

BRIEF DESCRIPTION OF THE PREFERRED EMBODIMENTS

Figure 3:
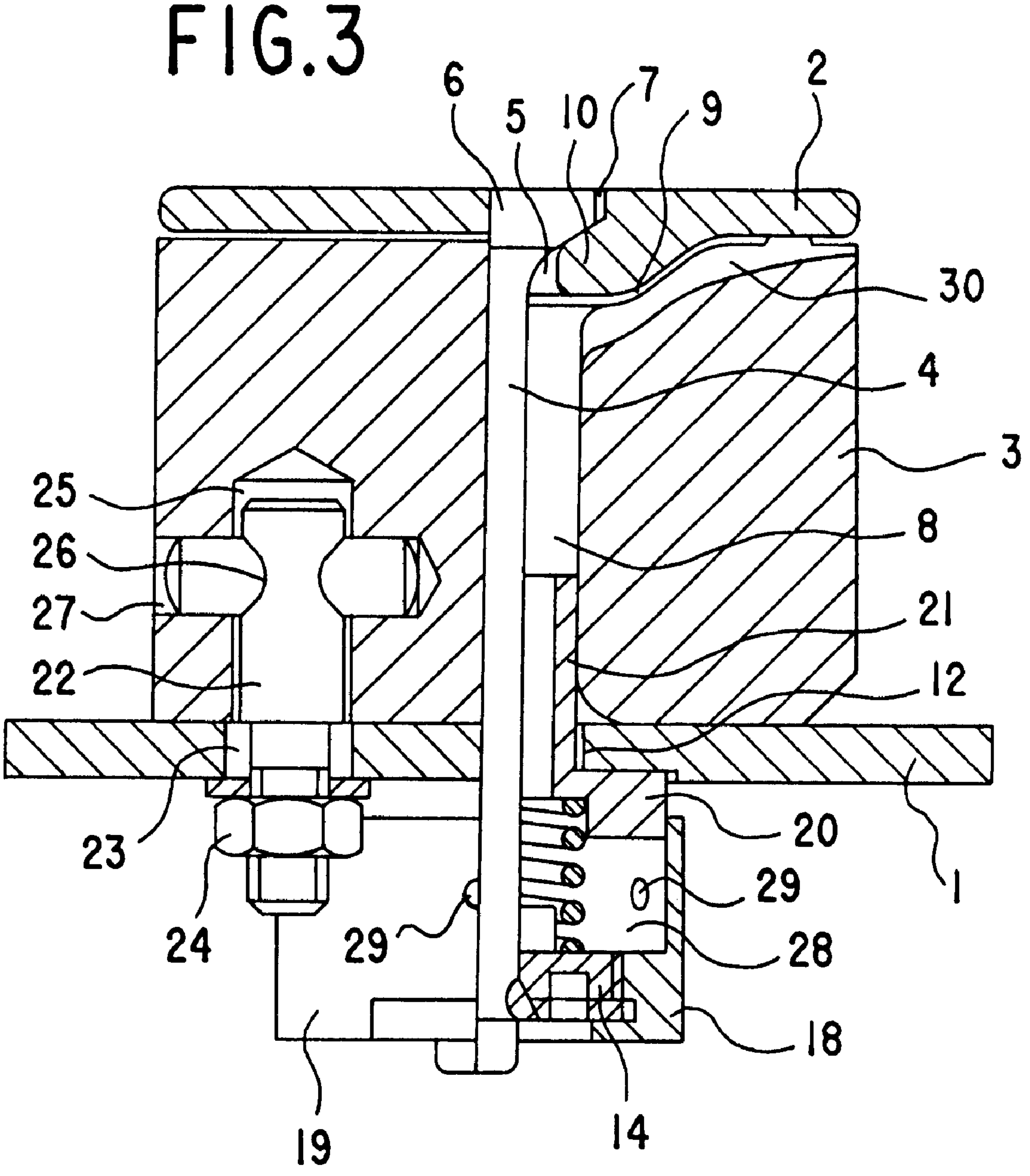
FIG. 3 is a sectional view through a second embodiment of the heat shield configuration.

In all the figures of the drawing, sub-features and integral parts that correspond to one another bear the same reference symbol in each case. Referring now to the figures of the drawing in detail and first, particularly, to FIG. 1 thereof, there is shown a segment of a heat shield configuration for protecting a supporting structure 1 against a hot fluid. The segment forms an inner lining 2*a*. The inner lining 2*a* is composed of heat-shield elements 2 that are disposed next to one another so as to cover its entire area, with gaps 2*b* being left. The heat-shield element 2 consists of an erosion-proof and corrosion-proof material. It is preferably a ceramic-coated metal plate. An insulating brick 3 is disposed between the heat-shield element 2 and the supporting structure 1. The insulating brick 3 consists of a refractory ceramic.

The heat-shield element 2 is connected to the supporting structure 1 by a fastening element, particularly a bolt 4. The bolt 4 extends through a passage orifice 5 formed in the heat-shield element 2. The bolt 4 has, at a free end, a head 6 that rests on the heat-shield element 2. The heat-shield element 2 has a seat 7 for the head 6 of the bolt 4, so that the head 6 is countersunk in the heat-shield element 2.

The insulating brick 3 has a duct 8, through which the bolt 4 extends. The insulating brick 3 rests on the supporting structure 1. The insulating brick 3 has, in its surface facing the heat-shield element 2, a recess 9, into which engages a projection 10 constructed correspondingly on the heat-shield element 2.

As is evident from the illustration in FIG. 1, the bolt 4 has an end portion 11 that extends through the wall of the supporting structure 1. For this purpose, the wall of the supporting structure 1 has a passage bore 12. The end portion 11 of the bolt 4 is surrounded by a spring element 13 that is configured in the form of a compression spring. One abutment of the spring element 13 is formed by a holding element 14. The holding element 14 has a conically widening bore 17, through which the end portion 11 of the bolt 4 extends. The bolt 4 has, on its end portion 11, a peripheral groove 15, into which a wedge 16 engages. The wedge 16 bears on the conically widening bore 17. The holding element 14 is held to the bolt 4 by the wedge connection. A cap 18 is screwed to the holding element 14. The cap 18 has a casing 19 that extends towards the wall of the supporting structure 1. The cap 18 is of cylindrical construction. That portion of the cap 18 which is located opposite the holding element 14 engages around a spacer piece 20 disposed on the supporting structure 1. The spacer piece 20 has a recess, into which the spring element 13 engages. Furthermore, the spacer piece 20 is provided with a guide tube 21 that projects at least partially into the insulating brick 3. The inner cross-section of the guide tube 21 is greater than the cross-section of the stem of the bolt 4. The spring element 13 is disposed with prestress between the spacer piece 20 and the holding element 14. By the spring force of the spring element 13, an outwardly directed force is introduced into the bolt 4 via the holding element 14. This force is transmitted to the heat-shield element 2 via the head 6 of the bolt, with the result that the heat-shield element 2 is pressed against the insulating brick 3 which bears on the wall of the supporting structure 1.

The dimensions of the cap 18 are such that it terminates at a distance from the wall of the supporting structure 1, thereby allowing a relative movement of the cap 18 in the axial direction of the bolt 4.

For the additional retention of the insulating brick 3, a retaining bolt 22 is connected to the wall of the supporting structure 1. The retaining bolt 22 extends through a bore 23 formed in the wall of the supporting structure 1.

The retaining bolt 22 is connected to the wall of the supporting structure 1 via a screw connection 24. A blind-hole bore 25, into which the retaining bolt 22 projects, is formed in the insulating brick 3. A retaining pin 26 extends into the retaining bolt 22 and through the latter. The retaining pin 26 is positioned essentially perpendicularly to the longitudinal axis of the retaining bolt 22. A bore 27 is formed in the insulating brick 3 for the purpose of introducing the retaining pin 26.

FIG. 2 shows a bottom view of the configuration illustrated in FIG. 1. The sectional line I—I identifies the view according to FIG. 1.

FIG. 3 illustrates a second exemplary embodiment of the heat shield configuration . The basic construction of this configuration corresponds to the configuration illustrated in FIGS. 1 and 2. To that extent, reference is made to the description of FIGS. 1 and 2 in order to avoid repetition.

In the heat shield configuration for protecting the supporting structure 1 against a hot fluid, which is illustrated in FIG. 3, the possibility of cooling the heat-shield elements and the insulating brick 3 is illustrated. For this purpose, the cap 18 has bores 29 that open out in the chamber 28. The chamber 28 is delimited by the spacer piece 20, the cap 18 and the holding element 14. Cooling fluid connecting conduits may be connected to the bores 29. A cooling fluid flows through the bores 29 into the chamber 28. The cooling fluid flows from the chamber 28 through the guide tube 21 into a duct 30 formed in the insulating brick 3. An outwardly directed duct 30, through which the cooling fluid from the duct 8 flows out of the configuration, is formed between the insulating brick 3 and the heat-shield element 2. In the exemplary embodiment illustrated, the duct 30 is formed in the insulating brick 3. The duct 30 may also be formed by recesses in the heat-shield element 2 and in the insulating brick 3 as well as merely in the heat-shield element 2.

Figure 4:
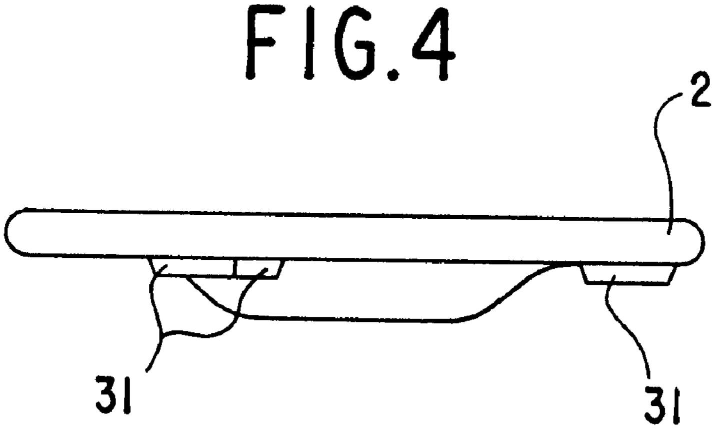
FIG. 4 is a front-elevational view of a heat-shield element with distance pieces.

FIG. 4 shows an exemplary embodiment of the heat-shield element 2 in a front-elevational view. The heat-shield element 2 consists, for example, of silicon carbide or silicon nitride. It has distance pieces 31 on the surface facing the insulating brick (not shown in FIG. 4). The distance pieces 31 are constructed essentially in the form of a truncated pyramid. They have a height of approximately 1 mm and a bearing surface of approximately 25 $mm^2$.

Figure 5:
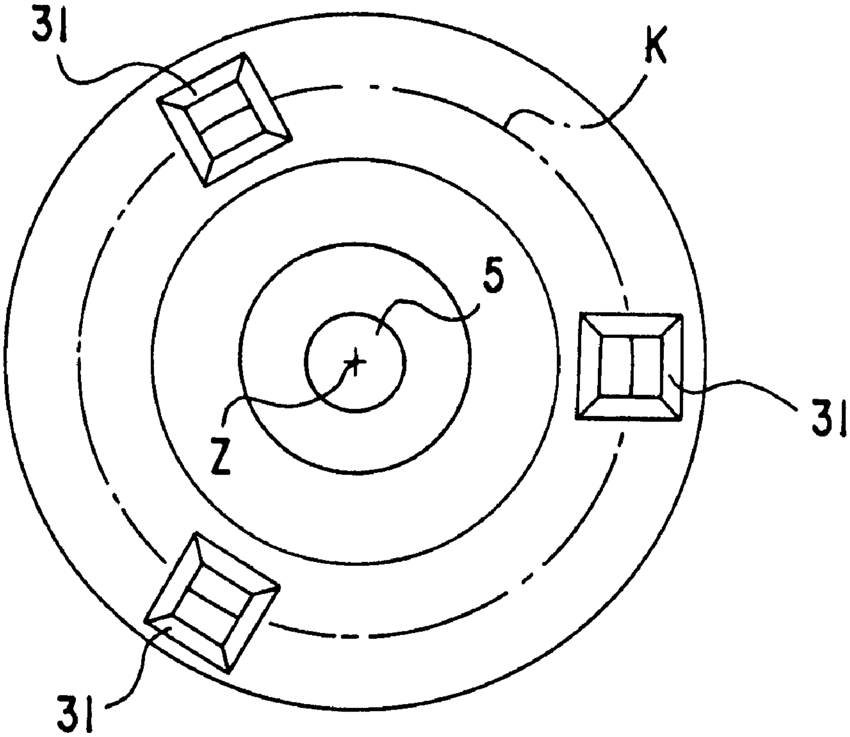
FIG. 5 is a bottom plan view of the heat-shield element according to FIG. 4.

The distance pieces 31 are constructed on an imaginary circle circumference K (see FIG. 5). The distance pieces are preferably disposed equidistantly from one another. The center of the imaginary circle circumference K is located essentially at the geometrical center of the heat-shield element 2, the center of the imaginary circle circumference K preferably coinciding with the geometrical center of the heat-shield element 2.

Formed at the center Z in the passage orifice 5, through which the bolt 4, as illustrated, for example, in FIGS. 1 and 3, can extend.

The distance pieces 31 ensure that the heat-shield element 2 is disposed on the insulating brick 3 at a distance from the latter. A cooling fluid can then flow between the insulating brick 3 and the heat-shield element 2, with the result that the heat-shield element 2 is cooled. The gap-like cooling duct 30 is formed between the heat-shield element 2 and the insulating brick 3 by the distance pieces 31.

It goes without saying that the distance pieces 31 may also be constructed on the insulating brick 3. The height or the gap size of the cooling duct 30 which is obtained by the distance pieces 31 may be adapted to the necessary thermal function.

We claim:

1. In combination with a supporting structure, a heat shield configuration for protecting the supporting structure against a hot fluid, the heat shield configuration comprising:

an inner lining formed of a heat-resistant material and having substantially plate-shaped heat-shield elements disposed next to one another with gaps in-between and covering an entire area of the supporting structure, said heat-shield elements formed of an erosion-proof and corrosion-proof material and being resistant to high temperatures;

at least one fastening element anchoring said heat-shield elements thermally movably to the supporting structure;

a thermal insulation disposed between said heat-shield elements and the supporting structure; and at least one coolant duct having an inlet and an outlet and formed between said heat-shield elements and said thermal insulation, said thermal insulation having a coolant supply duct formed therein connected to said inlet of said at least one coolant duct, said outlet of said at least one coolant duct being open to the hot fluid.

2. The heat shield configuration according to claim 1, wherein said heat-shield elements are formed of a structural ceramic.

3. The heat shield configuration according to claim 2, wherein said heat-shield elements are formed of a silicon carbide.

4. The heat shield configuration according to claim 2, wherein said heat-shield elements are formed of silicon nitride.

5. The heat shield configuration according to claim 1, wherein said thermal insulation is formed of a mat having of a fibrous material.

6. The heat shield configuration according to claim 1, wherein said thermal insulation is formed of a refractory ceramic.

7. The heat shield configuration according to claim 1, wherein said at least one fastening element is a bolt and said bolt is formed of a structural ceramic.

8. The heat shield configuration according to claim 7, wherein said thermal insulation has a duct formed therein through which said bolt extends.

9. The heat shield configuration according to claim 8, wherein said bolt is disposed with play in said duct.

10. The heat shield configuration according to claim 7, wherein said structural ceramic is formed of silicon carbide.

11. The heat shield configuration according to claim 7, wherein said structural ceramic is formed of silicon nitride.

12. The heat shield configuration according to claim 1, including a retaining bolt for connecting said thermal insulation to the supporting structure.

13. The heat shield configuration according to claim 1, wherein said heat-shield elements are disposed at a given distance from said thermal insulation for forming said at least one coolant duct as a gap-shaped coolant duct.

14. The heat shield configuration according to claim 13, wherein said given distance is between 0.3 and 1.5 mm.

15. The heat shield configuration according to claim 13, including at least one distance piece disposed between said heat-shield elements and said thermal insulation for forming said at least one coolant duct.

16. The heat shield configuration according to claim 15, wherein each of said heat-shield elements has a center, said at least one distance piece is one of at least three distance pieces associated with each of said heat-shield elements and disposed around a circumference of an imaginary circle having a center, said center of said imaginary circle disposed substantially at said center of each of said heat-shield elements.

17. The heat shield configuration according to claim 16, wherein said at least three distance pieces are disposed on at least one of said heat-shield elements and said thermal insulation.

18. The heat shield configuration according to claim 17, wherein said at least three distance pieces are integrated in one piece with one of said heat-shield elements and said thermal insulation.

19. The heat shield configuration according to claim 16, wherein said at least three distance pieces are bosses.

20. The heat shield configuration according to claim 19, wherein said at least three distance pieces each have a bearing surface of between 9 $mm^2$ and 64 $mm^2$.

21. The heat shield configuration according to claim 19, wherein said at least three distance pieces each have a bearing surface of approximately of 25 $mm^2$.

22. The heat shield configuration according to claim 13, wherein said given distance is 1 mm.

23. The heat shield configuration according to claim 1, wherein said insulating material is an insulating brick having said coolant supply duct formed therein.

* * * * *